H. S. RUSSELL & F. E. BERRY.
TWO PHASE ALTERNATING CURRENT DISTRIBUTION.
APPLICATION FILED MAY 6, 1907.

905,930.

Patented Dec. 8, 1908.

UNITED STATES PATENT OFFICE.

HERBERT SIDNEY RUSSELL, OF HANWELL, AND FREDERICK EDMUND BERRY, OF WEST DRAYTON, ENGLAND.

TWO-PHASE ALTERNATING-CURRENT DISTRIBUTION.

No. 905,930.　　　Specification of Letters Patent.　　Patented Dec. 8, 1908.

Application filed May 6, 1907. Serial No. 372,015.

*To all whom it may concern:*

Be it known that we, HERBERT SIDNEY RUSSELL and FREDERICK EDMUND BERRY, both subjects of the King of Great Britain, residing, respectively, at Fenbrook, Manor Court Road, Hanwell, in the county of Middlesex, and at Napoleon Villa, West Drayton, in said county, England, have jointly invented certain new and useful Improvements in Two-Phase Alternating-Current Distribution, of which the following is a specification.

This invention relates to two-phase systems of electrical distribution and in particular, although not exclusively, to the two-phase three-wire system in which a common return is provided for the two circuits, or in which the two returns are connected to a common bus bar, and consists in an improved arrangement of booster transformers according to which, instead of boosting the differently phased circuits separately, the boosting of both circuits is effected by the same transformer.

Figure 1:
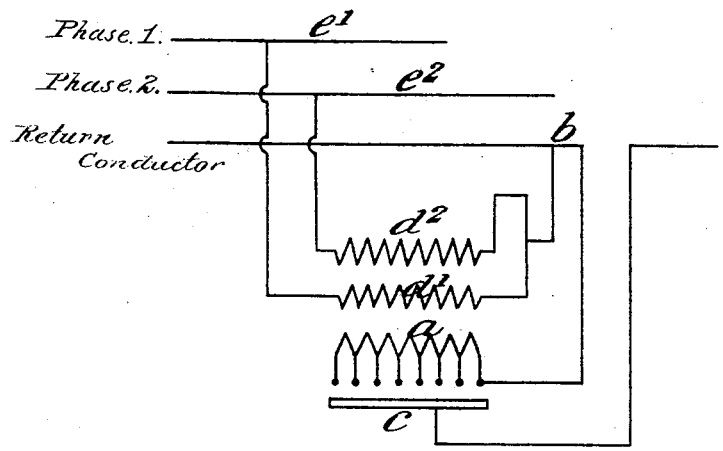
Figure 2:
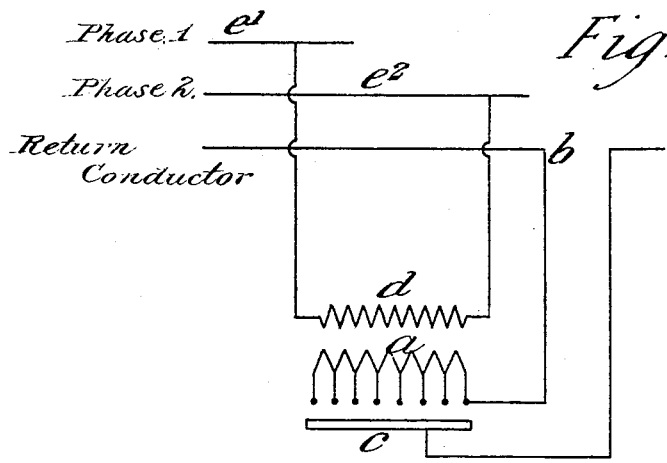

In the accompanying drawings Figure 1 shows diagrammatically one arrangement of the booster transformer windings according to the present invention, Fig. 2 being a modified arrangement thereof.

In both cases the booster or secondary winding $a$ of the transformer is included in the common return conductor or bus bar $b$, a suitable regulating switch $c$ being inserted if required to vary the number of effective turns or otherwise vary the voltage of the secondary.

In what would be the usual arrangement (Fig. 1), there are two boosting or primary windings $d'$, $d^2$ which are respectively connected between the separate phase conductors $e'$, $e^2$ and the common return or bus bar $b$.

In certain circumstances it may be desirable to effect a positive boost on one phase and a negative boost on the other, and in this case the arrangement of Fig. 2 is used, in which the transformer has a single primary winding $d$, connected across the separate phase conductors $e'$, $e^2$. It will be obvious that the boosted voltage may also be varied by varying the effective turns of the primary windings and that the secondary winding may be arranged in inductive relation with the common return instead of being included conductively therein.

Having thus described the nature of this invention and the best means we know of carrying the same into practical effect, we claim:—

1. In a two-phase alternating current distribution system having a common return conductor for both phases of the current, the method of boosting which consists in applying a boosting effort to the said return conductor which carries both phases of the current; substantially as described.

2. In a two-phase alternating current distribution, a booster transformer having coils or windings arranged to boost both phases of the current simultaneously.

3. In two-phase alternating current distribution having a common return conductor, a booster transformer having its boosted winding in the common return, substantially as described.

4. In two-phase alternating current distribution having a common return conductor, a booster transformer having its boosted winding in the common return and its boosting or primary winding connected with the separate phase conductors, substantially as described.

5. In two-phase alternating current distribution, a booster transformer having its boosted winding in the common return two boosting or primary windings connected respectively between the separate phase conductors and the common return, substantially as described.

In testimony whereof we have signed our names to this specification in the presence of two subscribing witnesses.

HERBERT SIDNEY RUSSELL.
　　　　　　FREDERICK EDMUND BERRY.

Witnesses:
　JOSEPH WILLARD,
　WALTER J. SKERTEN.